(12) United States Patent
Yalakanti et al.

(10) Patent No.: US 10,742,515 B2
(45) Date of Patent: Aug. 11, 2020

(54) DYNAMICALLY CUSTOMIZING TIME SERIES CHARTS BASED ON CONTEXTUAL DATA

(71) Applicant: HEWLETT PACKARD ENTERPRISE DEVELOPMENT LP, Houston, TX (US)

(72) Inventors: Ramachandra Yalakanti, Roseville, CA (US); Charles F. Clark, Roseville, CA (US); Kevin Tajeran, Roseville, CA (US); Seetharam Pranihith Venuturupalli, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 134 days.

(21) Appl. No.: 16/010,996

(22) Filed: Jun. 18, 2018

(65) Prior Publication Data
US 2019/0386885 A1    Dec. 19, 2019

(51) Int. Cl.
G06F 15/173    (2006.01)
H04L 12/24    (2006.01)
G06F 11/30    (2006.01)

(52) U.S. Cl.
CPC .......... *H04L 41/14* (2013.01); *G06F 11/3006* (2013.01); *G06F 11/3065* (2013.01); *H04L 41/22* (2013.01)

(58) Field of Classification Search
USPC ................................ 709/224, 223, 226, 217
See application file for complete search history.

(56) References Cited

U.S. PATENT DOCUMENTS

9,819,565 B2    11/2017    Djukic et al.
2015/0281006 A1    10/2015    Kasturi et al.

*Primary Examiner* — Lan Dai T Truong
(74) *Attorney, Agent, or Firm* — McDermott Will & Emery (57) ABSTRACT

A computer-implemented method includes receiving, at a client device, a plurality of monitors each including at least one resource related to a network device; automatically displaying, on the client device, a subset of the plurality of monitors including the at least one resource on a first time series chart based on a pre-determined risk factor; at least one of (1) selecting, using the client device, at least one monitor not included in the subset and included in the plurality of monitors, and (2) un-selecting, using the client device, at least one monitor included in the subset, and thereby obtain a customized set of monitors and resources; accessing, using the client device, a time series database associated to the network device to query for data related to resources included in the customized set of monitors; and displaying, on the client device, the customized set of monitors and the included resources on a second time series chart.

20 Claims, 9 Drawing Sheets

DYNAMICALLY CUSTOMIZING TIME SERIES CHARTS BASED ON CONTEXTUAL DATA

BACKGROUND

Network administrators typically refer to time series charts including the variation in operating parameters of a network device being monitored. The time series charts may be pre-populated with the trends in the operating parameters being monitored. It may be desirable to customize the time series chart to display operating parameters of relevance to the network administrator.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Embodiments disclosed address a technical problem arising in computer networking technology wherein multiple operational parameters of a network device are displayed on a time series chart. Not all the displayed operational parameters may be relevant to a user (e.g., network administrator) or the display of multiple parameters may cause the user to overlook the more relevant operation parameters. Embodiments disclose enable a user to selectively display desired operational parameters of a network device (e.g., a switch) on a time series chart that the user believes are of greater importance compared to other operational parameters.

Accordingly, methods and systems, according to the embodiments disclosed herein, may reduce substantially the amount of data to the data that the user believes is critical. As a result, the user is able to better monitor the operating state of the network device and perform task associated with the network device more efficiently.

Embodiments disclosed are directed to a network analytics engine that is defined as a script (e.g., a Python script) and that includes the operational parameters (also referred to herein as resources) of the network device that are to be monitored. Example resources may include CPU and memory utilization of the network device, interface status, latency, port statuses and configuration, and the like. The network analytics engine script also defines one or more actions to be performed when certain user-defined rules are satisfied. For instance, the scripts may monitor average CPU usage and send a system log message when the CPU usage is greater than 70% for 5 minutes. As another example, the script may monitor the connection state of a particular Border Gateway Protocol (BGP) neighbor and executing a command-line interface (CLI) command when the connection state transitions from UP to DOWN The network analytics engine includes one or more agents, each of which is a specifically-configured executable instance of a network analytics engine script stored on a network device. When the agent is enabled, it performs the tasks defined by the script.

The network analytics engine script includes one or more monitors, each defining the resource the agent monitors when the agent is enabled on a corresponding network device. A monitor may include a single resource to be monitored or may include multiple resources to be monitored.

The network analytics engine includes a built-in time series database. Time-series data about the resources monitored by agents are automatically collected and displayed as graphs pertaining to the network device. The database provides the time-series data to the agents.

Embodiments disclosed also provide improved contextual data for each resources being monitored and, as a result, the user is able to determine with improved certainty the severity of each resources based on the contextual data of each resource. This allows the network administrator to make educated assumptions about which monitors and resources to display, and which monitors and resources to hide from display if these monitors and resources do not provided relevant data for the specific agent.

In certain aspects, a computer-implemented method that includes receiving, at a client device, a plurality of monitors each including at least one resource related to a network device; automatically displaying, on the client device, a subset of the plurality of monitors including the at least one resource on a first time series chart based on a pre-determined risk factor; at least one of (1) selecting, using the client device, at least one monitor not included in the subset and included in the plurality of monitors, and (2) unselecting, using the client device, at least one monitor included in the subset, and thereby obtain a customized set of monitors and resources; accessing, using the client device, a time series database associated to the network device to query for data related to resources included in the customized set of monitors; and displaying, on the client device, the customized set of monitors and the included resources on a second time series chart.

In certain aspects, a system is described that includes a memory storing instructions; and one or more processors configured to execute the instructions to receive, at a client device, a plurality of monitors each including at least one resource related to a network device. The one or more processors also execute instructions to automatically display, on the client device, a subset of the plurality of monitors including the at least one resource on a first time series chart based on a pre-determined risk factor, and (1) select, using the client device, at least one monitor not included in the subset and included in the plurality of monitors, and/or (2) un-select, using the client device, at least one monitor included in the subset, and thereby obtain a customized set of monitors and resources. The one or more processors also execute instructions to access, using the client device, a time series database associated to the network device to query for data related to resources included in the customized set of monitors, and display, on the client device, the customized set of monitors and the included resources on a second time series chart.

In certain aspects, a non-transitory, computer-readable storage medium is described that includes computer-readable program code that, when executed by a processor, causes the processor to receive, at a client device, a plurality of monitors each including at least one resource related to a network device. The computer-readable program code that also causes the processor to automatically display, on the client device, a subset of the plurality of monitors including the at least one resource on a first time series chart based on a pre-determined risk factor, and (1) select, using the client device, at least one monitor not included in the subset and included in the plurality of monitors and/or (2) un-select, using the client device, at least one monitor included in the subset, and thereby obtain a customized set of monitors and resources. The computer-readable program code that also causes the processor to access, using the client device, a time series database associated to the network device to query for data related to resources included in the customized set of monitors, and display, on the client device, the customized set of monitors and the included resources on a second time series chart.

In certain aspects, a system is described that includes means for receiving, at a client device, a plurality of monitors each including at least one resource related to a network device; means for automatically displaying, on the client device, a subset of the plurality of monitors including the at least one resource on a first time series chart based on a pre-determined risk factor; means for at least one of (1) selecting, using the client device, at least one monitor not included in the subset and included in the plurality of monitors, and (2) un-selecting, using the client device, at least one monitor included in the subset, and thereby obtain a customized set of monitors and resources; means for accessing, using the client device, a time series database associated to the network device to query for data related to resources included in the customized set of monitors; and means for displaying, on the client device, the customized set of monitors and the included resources on a second time series chart.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architecture

Figure 1:
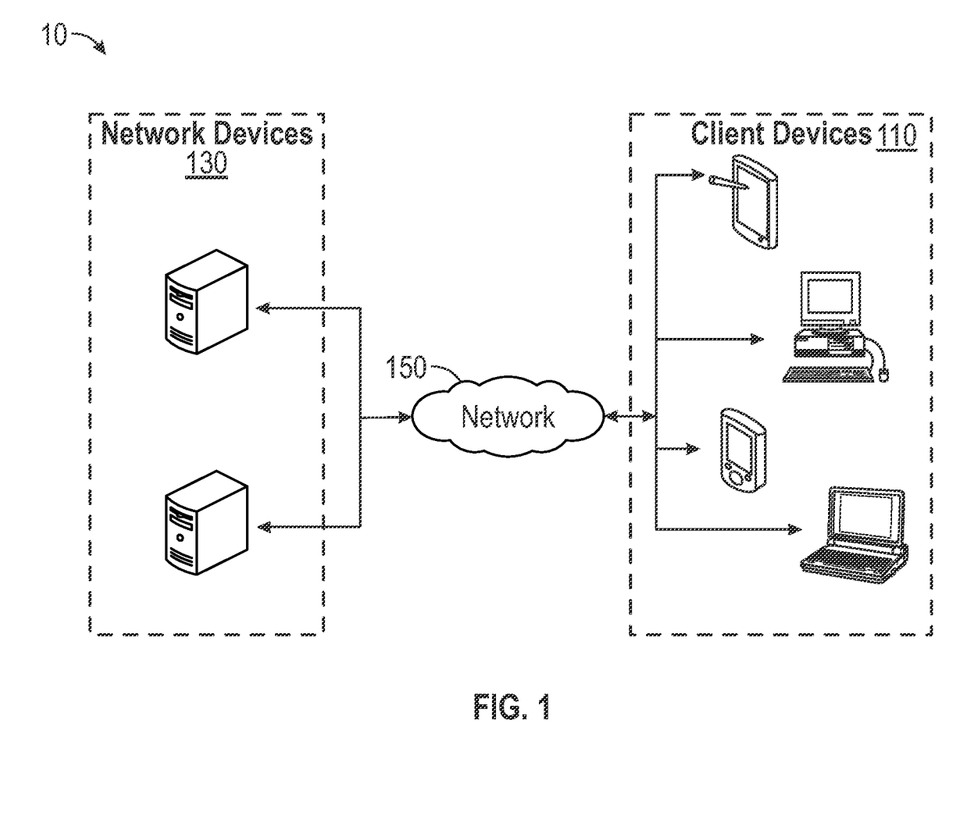
FIG. 1 illustrates an example architecture suitable for displaying network time series data with adaptable zoom intervals, according to some embodiments.

FIG. 1 illustrates an example architecture 10 for deployment of a network device-less application in a cloud computing environment. Architecture 10 includes application orchestrator 100, network devices 130 and client devices 110 connected over a network 150. One of the many network devices 130 is configured to host a memory including instructions which, when executed by a processor, cause the network device 130 to perform at least some of the steps in methods as disclosed herein. In some embodiments, the processor is configured to perform an application running in one or more of client devices 110. For purposes of load balancing, multiple network devices 130 can host memories including instructions to one or more processors to perform an instance of one of multiple functions to complete the application.

Network devices 130 may include any device having an appropriate processor, memory, and communications capability for hosting at least one instance of a function in a network device-less application, and an application orchestrator engine 100. Any one of network devices 130 may be accessible by various client devices 110 over network 150. Client devices 110 can be, for example, desktop computers, mobile computers, tablet computers (e.g., including e-book readers), mobile devices (e.g., a smartphone or PDA), or any other devices having appropriate processor, memory, and communications capabilities for accessing the network device application in one or more of network devices 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

The architecture 10 enables cloud providers to provide performance guarantees for network device applications. This helps to increase revenue by enabling a differentiated service which leads to more customers and enables optimal app placement which in turn results in efficient resource usage, saving energy and usage costs for the cloud provider. Also, architecture 10 enables accountability for the cloud provider thus fulfilling the goal of network device computing where cloud providers rather than customers are accountable for application performance. Accordingly, embodiments as disclosed herein include more reliable network device provider and enable declarative management for applications, that is, the customer or developer of the application only needs to declaratively specify the application performance policy or intent and the cloud provider handles the policy implementation using our invention. Thus, simplifying things for the customer.

The architecture 10 allows distributed deployment of functions in applications so that a distributed topology of network devices 130 is efficiently utilized while maintaining app performance-based service level agreements. Architecture 10 allows customers to estimate and limit their usage costs by writing performance-based service level agreements that take into account the fine-grained, pay-as-you-go for the resources you are using model of network device computing. Architecture 10 is able to handle the uncertain nature of network device computing and maintains app performance-based service level agreements by continuously monitoring the cloud state and re-orchestrating applications when needed. In some embodiments, architecture 10 uses probabilistic programming as policy specification language which is a natural fit for probabilistic policy specification in network device computing, thus simplifying the specification task for developers.

Figure 2:
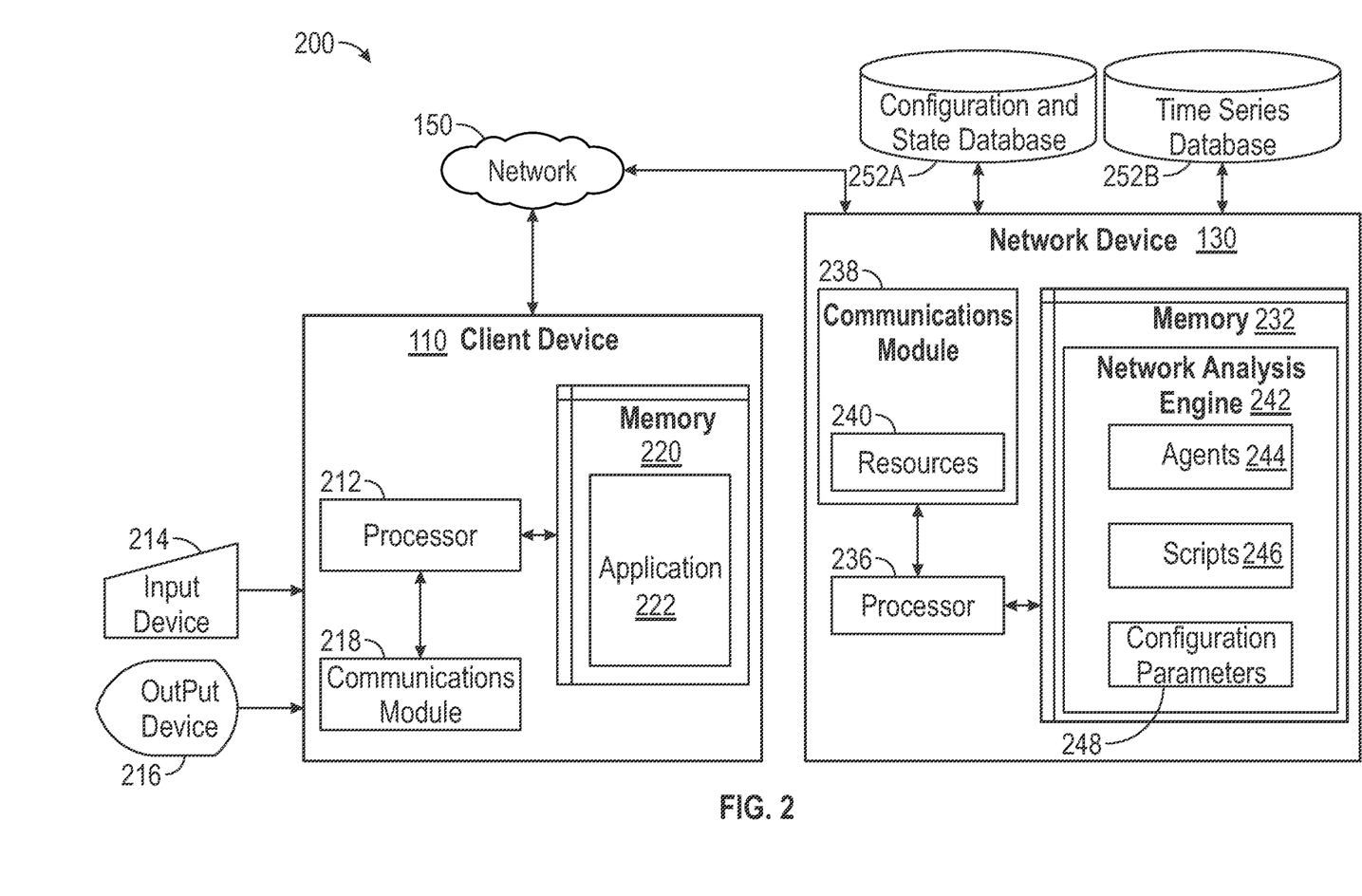
FIG. 2 is an architecture illustrating an example network device and client from the architecture of FIG. 1, according to certain aspects of the disclosure.

FIG. 2 is a network architecture 200 illustrating an example network device 130 and client device 110 in the architecture 10 of FIG. 1, according to certain aspects of the disclosure. Client device 110 and network device 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards. Client device 110 may also be coupled with an input device 214 and an output device 216. Input device 214 may include a mouse, a keyboard, a touchscreen and the like. Output device 216 may include a display, a touchscreen, a microphone, and the like. In some embodiments, input device 214 and output device 216 may be included in the same unit (e.g., a touchscreen).

Network device 130 includes a memory 232, a processor 236, and communications module 238. Network device 130 may be any device used to handle data communication in a network, e.g., a node, a switch, a multiplexer, a router, an access point. In that regard, network device 130 may include any one of a wired terminal (e.g., a copper cable, a fiber optic cable), or a wireless terminal (e.g., Wi-Fi, Bluetooth, cellular network, and the like), or any combination thereof. Processor 236 is configured to execute instructions, such as instructions physically coded into processor 236, instructions stored in memory 232, or a combination of both. In some embodiments, an application 222 in client device 110 may be installed by network device 130 and perform scripts and other routines provided by network device 130. Execution of application 222 may be controlled by a processor 212 in client device 110. Communications module 238 may include hardware and/or software resources that enable the operation of network device 130 within a network. These resources include input ports and output ports, buffers, first-in, first-out (FIFO) registers, serializer-de-serializer circuits (SERDES), multiplexers and the like.

Memory 232 includes a network analytics engine (NAE) 242 configured to receive requests from a user to obtain performance parameters of the network device. In some embodiments, network analysis engine 242 supports micro service extension capabilities to troubleshoot network device 130, including specific business-critical applications. In some embodiments, network analysis engine 242 includes a python sandbox with full access to databases 252.

The NAE 242 includes multiple agents 244 configured to perform tests and collect data from network device 130 and evaluate its performance. Agents 244 are configured by users (e.g., network administrators using client devices 110) via scripts 246. Scripts 246 may include calls and references to multiple configuration parameters 248. Configuration parameters 248 include parameters used in the configuration of network device 130, and other relevant information for the maintenance and operation of network device 130. In some embodiments, at least one of configuration parameters 248 instructs agents 244 to periodically monitor a performance of at least one resource in network device 130. For example, in some embodiments to provide a requested value of a resource or perform any other monitoring function (as determined by scripts 246) every five seconds, or even faster. In some embodiments, a configuration parameter 248 is configured to retrieve a packet throughput of at least one input/output port in network device 130.

Architecture 200 also illustrates a configuration and state database 252A, and a time series database 252B (hereinafter, collectively referred to as "databases 252") storing data values for one or more resources 240 of network device 130, as collected by agents 244. Databases 252 may be communicatively coupled with network device 130 (e.g., through network 150, through each other, or separately). The NAE 242 includes multiple agents 244 configured to perform tests and collect data from network device 130 and evaluate its performance. The agents 244 are configured by users (e.g., network administrators using client devices 110) via scripts 246. The scripts 246 may include calls and references to multiple configuration parameters 248 and the scripts 246 may be configured to monitor databases 252 based on URL patterns including wildcards and ranges.

Figure 3:
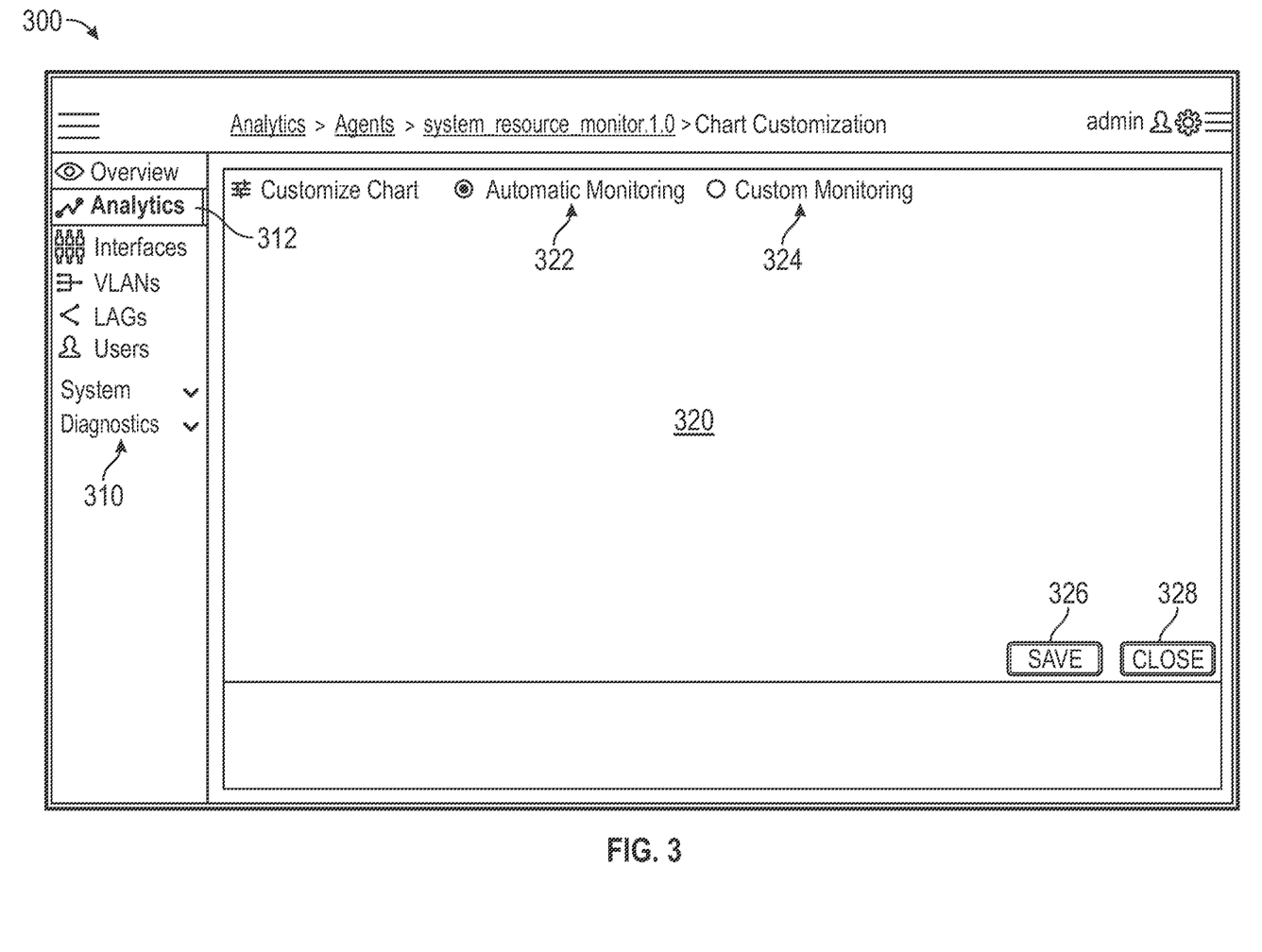
FIG. 3 illustrates a user-interface (UI) for a network analytics engine, according to embodiments disclosed.

FIG. 3 illustrates an example user interface (UI) (or dashboard) 300 for communicating with a NAE (e.g., NAE 242), according to embodiments disclosed. The UI 300 may be accessed by a user (e.g., a network administrator) to determine the behavior and performance of a network device (e.g., a network switch). The user may access UI 300 remotely, through an application installed in a client device and communicating with the network device (e.g., application 222 and client device 110). The UI 300 may include a menu field 310 that contains tabs and options for the user, and a customization screen 320 that provides the user the option to select an automatic monitoring option 322 or a customized monitoring option 324. The UI 300 provides the user access to information related to NAE agents, scripts, and alerts on the network device, including time-series data graphs and other information generated by the enabled agents, and is displayed when the user selects the analytics option 312 in the menu field 310.

The automatic monitoring option 322 is selected by default when the analytics option 312 is selected. When selected, the NAE 242 automatically (e.g., without user intervention) provides the user a set of resources of the network device, which at the time of selection, are considered to provide relevant and meaningful data that the user may want to have monitored. For instance, the set of resources may be determined based on a pre-determined algorithm that is executed by the NAE 242. In an example, the algorithm may provide the user with a subset of monitors and the associated resources that is selected based on a pre-determined risk factor. The pre-determined risk factor may be determined by contextual information (See FIGS. 5 and 6 and related description) related to the monitors and resources. Based on the contextual information, certain monitors and resources may be considered at an increased risk, and in an undesirable operating state. When the user clicks on the CLOSE button 328, the time series chart including the automatically chosen set of resources is displayed. It should be noted that the set of resources automatically chosen may be different at different times since the resources the NAE 242 considers to provide relevant and meaningful data to the user may change with time. Selecting the customized monitoring option 324 and clicking the SAVE button 326 changes the UI 300 to display a customization chart 330 (described below with reference to FIG. 5)

Figure 4:
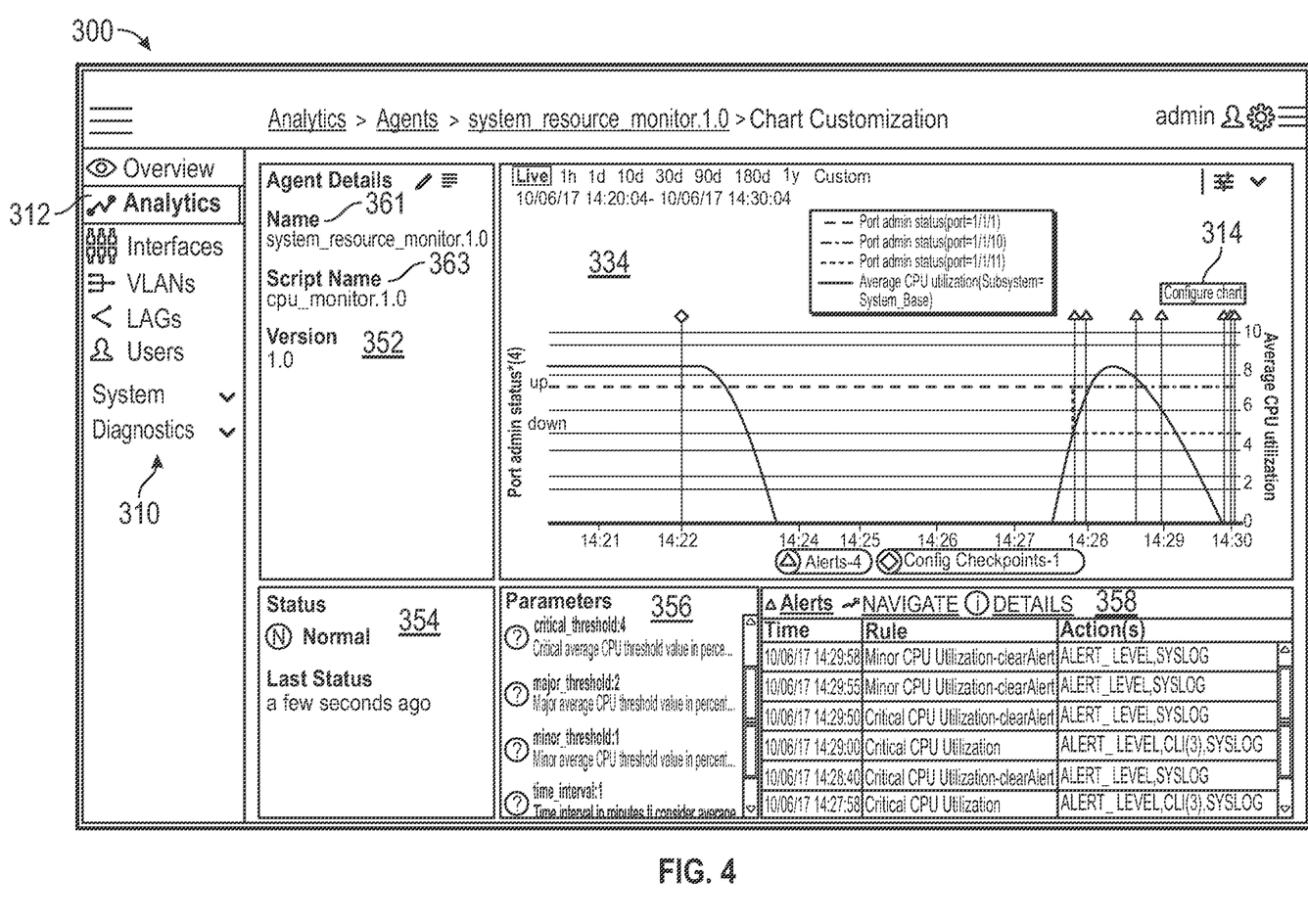
FIG. 4 illustrates the UI of FIG. 3 displaying a time series chart including automatically selected set of resources, according to embodiments disclosed.

FIG. 4 illustrates the UI 300 displaying a time series chart 334 including the automatically selected set of resources. The time series chart 334 displays the variation in the resources with time, with the time being plotted along the abscissa. Different plots (e.g., differentiated by color) each corresponding to the different resources are displayed in the time series chart 334. For instance, as illustrated, the time series chart 334 includes the automatically selected resources PLOT=1/1/1, PLOT=1/1/10, and PLOT 1/1/11, each associated with monitor PORT ADMIN STATUS. Additionally, the resource SUBSYSTEM=SYSTEM_BASE associated with the monitor AVERAGE CPU UTILIZATION is also included in the time series chart 334.

The UI 300 also displays an agent field 352, a status field 354, a parameters field 356, and an alerts field 358. The agent field 352 indicates the name 361 of the agent selected for monitoring network device 130, the name 363 of the script the agent is executing. The status field 354 indicates the current status of the network device, which is indicated as 'normal' in this case. The parameters field 356 displays a list of parameters for the script and the parameter values that have been provided for this particular agent. The parameters may include, but are not limited to, a critical threshold (e.g., the critical average CPU threshold value in percentage), a major threshold (e.g., a major average CPU threshold value in percentage), a minor threshold (e.g., a minor average CPU threshold value in percentage), a time interval (e.g., a time interval in minutes), etc. The alerts field 358 displays a log of the one or more actions performed when the corresponding criteria specified in user-defined rules are satisfied.

At some point, the user may wish to customize the time series chart 334. In order to do so, the user selects the configured chart button 314 and the customization screen 320 (FIG. 3) is displayed. The user then selects the customized monitoring option 324 on the UI 300 and clicks on the SAVE button 326. Clicking the SAVE button 326 will change the UI 300 to display a customization chart 330.

Figure 5:
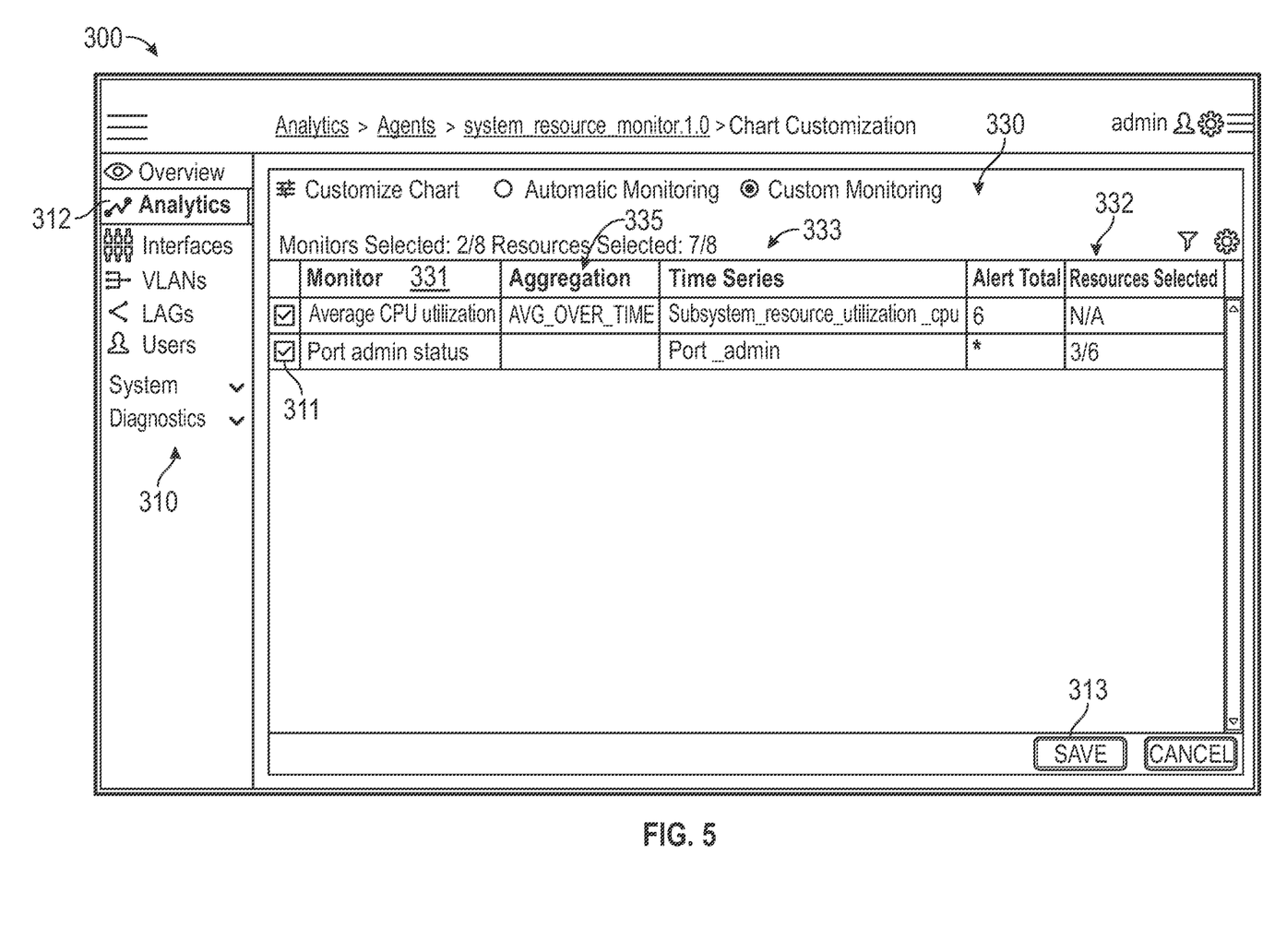
FIG. 5 illustrates the UI of FIG. 3 displaying a customization chart when the customized monitoring option is selected in the UI of FIG. 3, according to embodiments disclosed.

FIG. 5 illustrates the UI 300 displaying the customization chart 330 when the customized monitoring option 324 is selected, according to embodiments disclosed. The customization chart 330 allows the user to customize the monitors and resources to be displayed. In an example, the user may customize based on a user preference that is facilitated by the pre-determined risk factor used to automatically select the resources displayed in the time series chart 334 (FIG. 4). As illustrated, the example customization chart 330 includes a list of monitors 331 that were automatically selected by the NAE 242, and the number of resources 332 corresponding to each monitor 331 and selected for display (in the time series chart 334).

As mentioned above, each monitor 331 may be associated with one or more resources 332. The UI 300 indicates the number of resources 332 for each monitor 331 that are currently selected for display. For instance, in FIG. 5, only one resource is associated with the monitor AVERAGE CPU UTILIZATION and is thus the only one that can be displayed when the monitor AVERAGE CPU UTILIZATION is selected. Therefore, the number of resources 332 against the monitor AVERAGE CPU UTILIZATION is indicated by N/A. On the other hand, 3 out of a total of 6 resources associated with the monitor PORT ADMIN STATUS are currently selected for display and therefore the selected number of resources 332 is indicated by 3/6. However, it will be understood that the number of resources selected may be fewer or greater than 3.

The customization chart 330 also displays the identifier of the time series 333 corresponding to the respective monitors 331. For instance, and as illustrated, the identifier SUBSYSTEM_RESOURCE_UTILIZATION_CPU is used when displaying the resource associated with the monitor AVERAGE CPU UTILIZATION. Similarly, as illustrated, the identifier PORT_ADMIN is used when displaying the resources associated with the monitor PORT ADMIN STATUS. In addition, the customization chart 330 also displays contextual information for each monitor and resource. The contextual information may include, for example, the alerts totals for each monitor (and for each resource included in the monitor See FIG. 6 below)), names of monitors and resources, aggregation functions associated with the monitors and resources, and the like. The user can select/un-select one or more monitors and/or resources to be displayed based on the contextual information. For instance, it may be desirable to display monitors and/or resources having higher alerts totals. The aggregation column 335 indicates if that the corresponding monitor 331 is collecting a set of data that is processed by an aggregation function, such as mean or sum.

Figure 6:
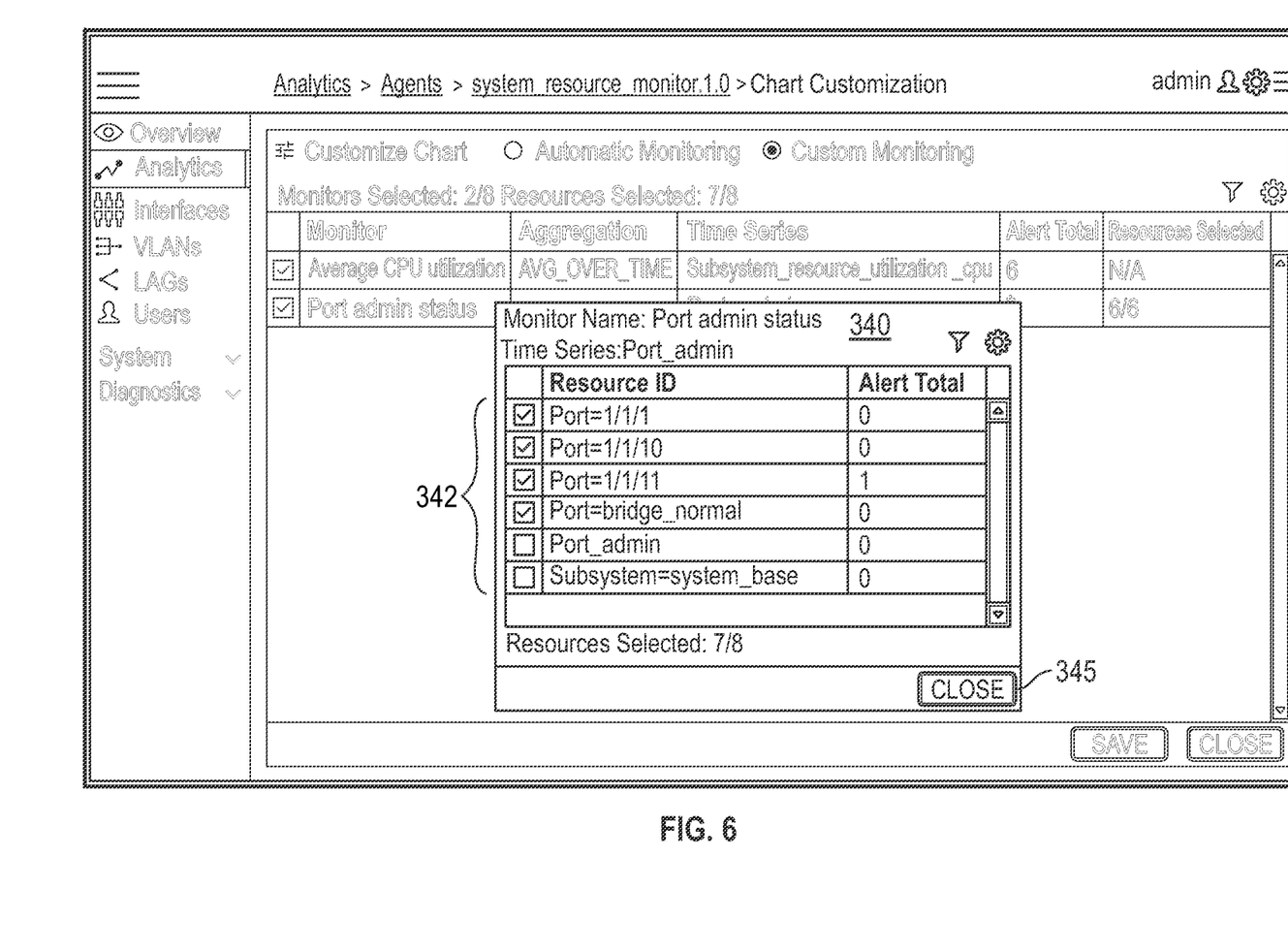
FIG. 6 illustrates a pop-up menu displayed in the UI of FIG. 5, according to embodiments disclosed.

When the monitor having more than one associated resource is selected, the user is provided with a menu to choose one or more associated resources the user desires to be displayed. For example, referring to FIG. 5, when the check box 311 next to the monitor PORT ADMIN STATUS is selected, a pop-up menu 340 is displayed, as illustrated in FIG. 6. The pop-up menu 340 lists all the resources 342 associated with the monitor PORT ADMIN STATUS by their resource IDs. In the example illustrated in FIG. 6, user has chosen to select four resources 342 (PLOT=1/1/1, PLOT=1/1/10, PLOT=1/1/11, and PORT=BRIDGE_NORMAL) have been selected for display. However, in other embodiments, the fewer or greater number of resources 342 may be selected. After the desired number of resources 342 have been selected, the user may select the CLOSE button 345 to close the pop-up menu 340. The user may then select the SAVE button 313 and a time series chart including the selected resources 342 is displayed. Thus, using the customized monitoring option 324, the user can add additional monitors and resources to the automatically generated subset and/or delete monitors and resources from the automatically generated subset, and thereby obtain a customized set of monitors and resources.

Figure 7:
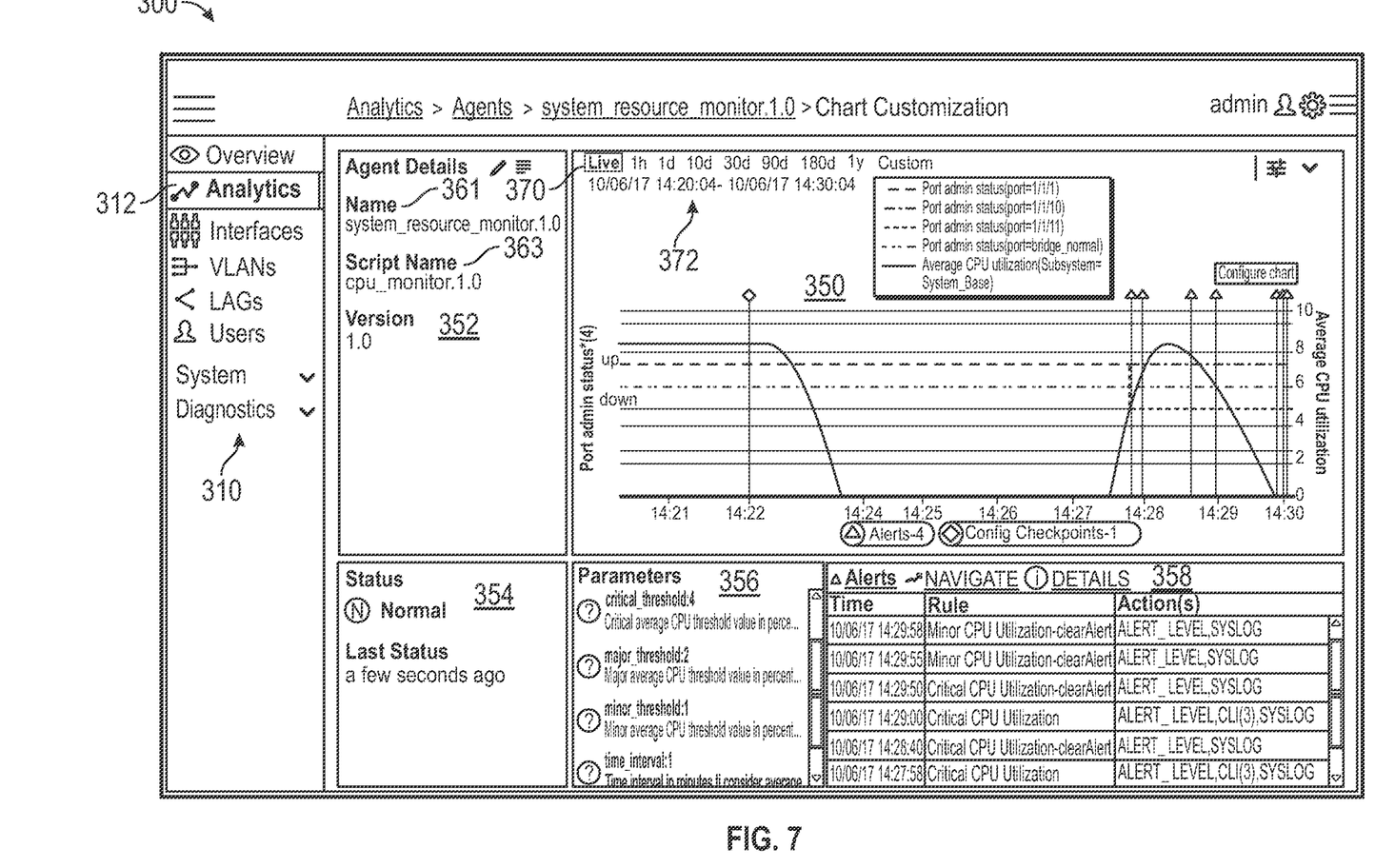
FIG. 7 illustrates the UI displaying time series chart including the selected resources in FIG. 6 and the resource associated with the monitor in FIG. 5.

FIG. 7 illustrates the UI 300 displaying time series chart 350 including the selected resources 342 in FIG. 6 and the resource associated with the monitor AVERAGE CPU UTILIZATION in FIG. 5. The agent field 352, the status field 354, the parameters field 356, and the alerts field 358, are displayed along with the time series chart 350.

As indicated at 370, 'LIVE' indicator is highlighted indicating that the values of the resources PLOT=1/1/1, PLOT=1/1/10, PLOT=1/1/11, and PORT=BRIDGE_NORMAL in the time series chart 350 are real-time (or almost real-time) values. However, it may be possible to display values from a previous time period by selecting any one of options 372. As an example, and as illustrated, by selecting one of options 372 including '1 hour', '1 day', '10 days', '30 days', '90 days', '180 days', and '1 year'. In addition, the user may also select a custom time period using the 'Custom' option to display the previous trends in the resources PLOT=1/1/1, PLOT=1/1/10, PLOT=1/1/11, and PORT=BRIDGE_NORMAL.

Embodiments disclosed herein provide numerous advantages over existing technologies, and thereby improve the existing technology. For instance, using the time series charts, the user can monitor resources that are dynamic and that may change on-the-fly. This solution allows the user to selectively monitor specific data that may not be known when the time series chart was initially created (for example, in the automatic monitoring option 322). Using the contextual data for each monitor and resource, allows a user to make an educated decision regarding what resource(s) to monitor. Embodiments also provide the user the ability to disable data polling and tracking for specific monitor and resources that may not require constant monitoring, thereby saving time and resources, and making the process more streamlined. As a result, the user can choose the monitors and resources desired to be displayed on the time series charts. The user is also provided the ability to automatically and dynamically monitor time series monitors and resources by prioritizing data that is determined be in an undesirable state.

Figure 8:
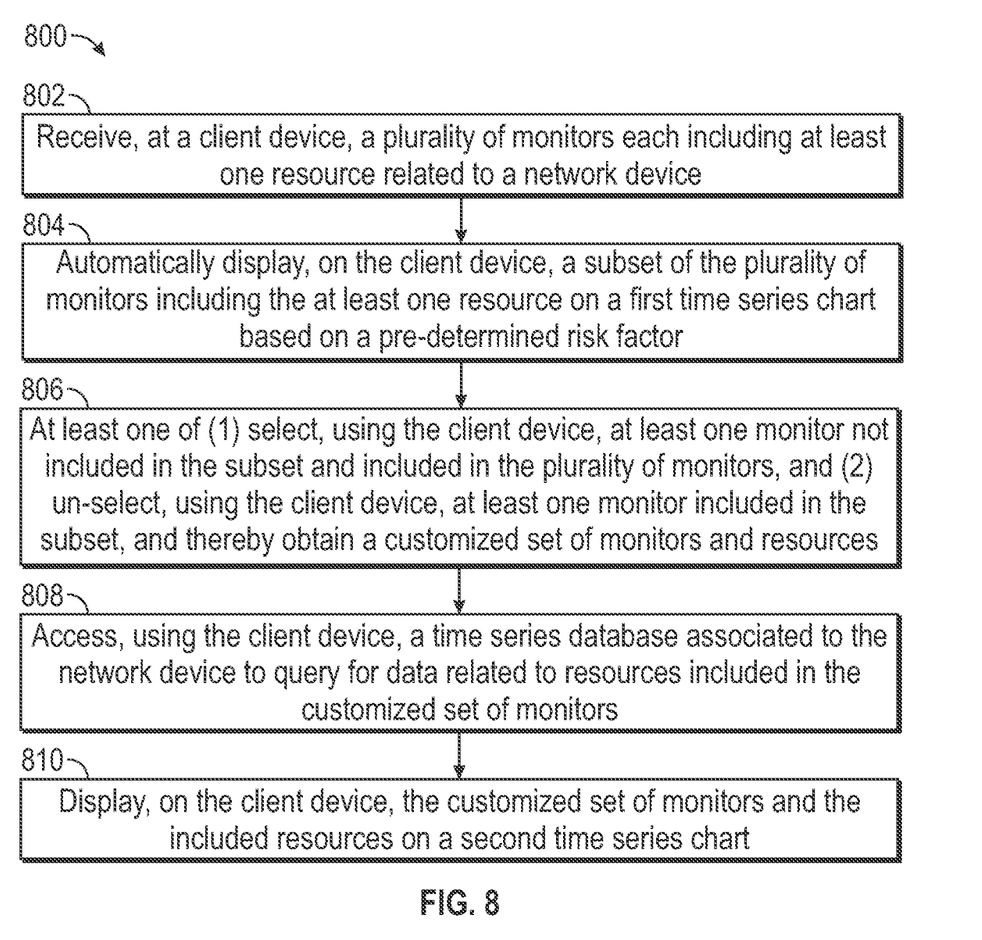
FIG. 8 is a flow chart illustrating steps in a method for customizing a time series chart, according to embodiments disclosed.

FIG. 8 is a flow chart illustrating steps in a method 800 for customizing a time series chart, according to some embodiments. The method 800 may be performed at least partially by any one of multiple network devices, while communicating with any one of a plurality of client devices (e.g., any one of network devices 130 and any one of client devices 110). The network device may be hosting a network analysis engine configured to perform at least a portion of an application installed in a client device (e.g., application 222). The client devices may be handled by a user, wherein the user may be an administrator of network 150. At least some of the steps in method 800 may be performed by a computer having a processor executing commands stored in a memory of the computer (e.g., processors 212 and 236, memories 220 and 232). Further, steps as disclosed in method 800 may include retrieving, editing, and/or storing files in a database that is part of, or is communicably coupled to, the computer, using, inter alia, a network analysis engine (e.g., network analysis engine 242). The database may include any one of a configuration and state database, and a time series database (e.g., configuration and state database 252A and time series database 252B). Methods consistent with the present disclosure may include at least some, but not all, of the steps illustrated in method 800, performed in a different sequence. Furthermore, methods consistent with the present disclosure may include at least two or more steps as in method 800 performed overlapping in time, or almost simultaneously.

The method 800 includes receiving, at a client device, a plurality of monitors each including at least one resource providing a plurality of monitors and resources related to a network node device, at 802. The method 800 then automatically displays, on the client device, a subset of the plurality of monitors including the at least one resource on a first time series chart based on a pre-determined risk factor, at 804. The method 800 further includes (1) selecting, using the client device, at least one monitor not included in the subset and included in the plurality of monitors, and/or (2) un-selecting, using the client device, at least one monitor included in the subset, and thereby obtain a customized set of monitors and resources, at 806. The method 800 then accesses, using the client device, a time series database associated to the network device to query for data related to resources included in the customized set of monitors, at 808, and displays, on the client device, the customized set of monitors and the included resources on a second time series chart, at 810.

Hardware Overview

Figure 9:
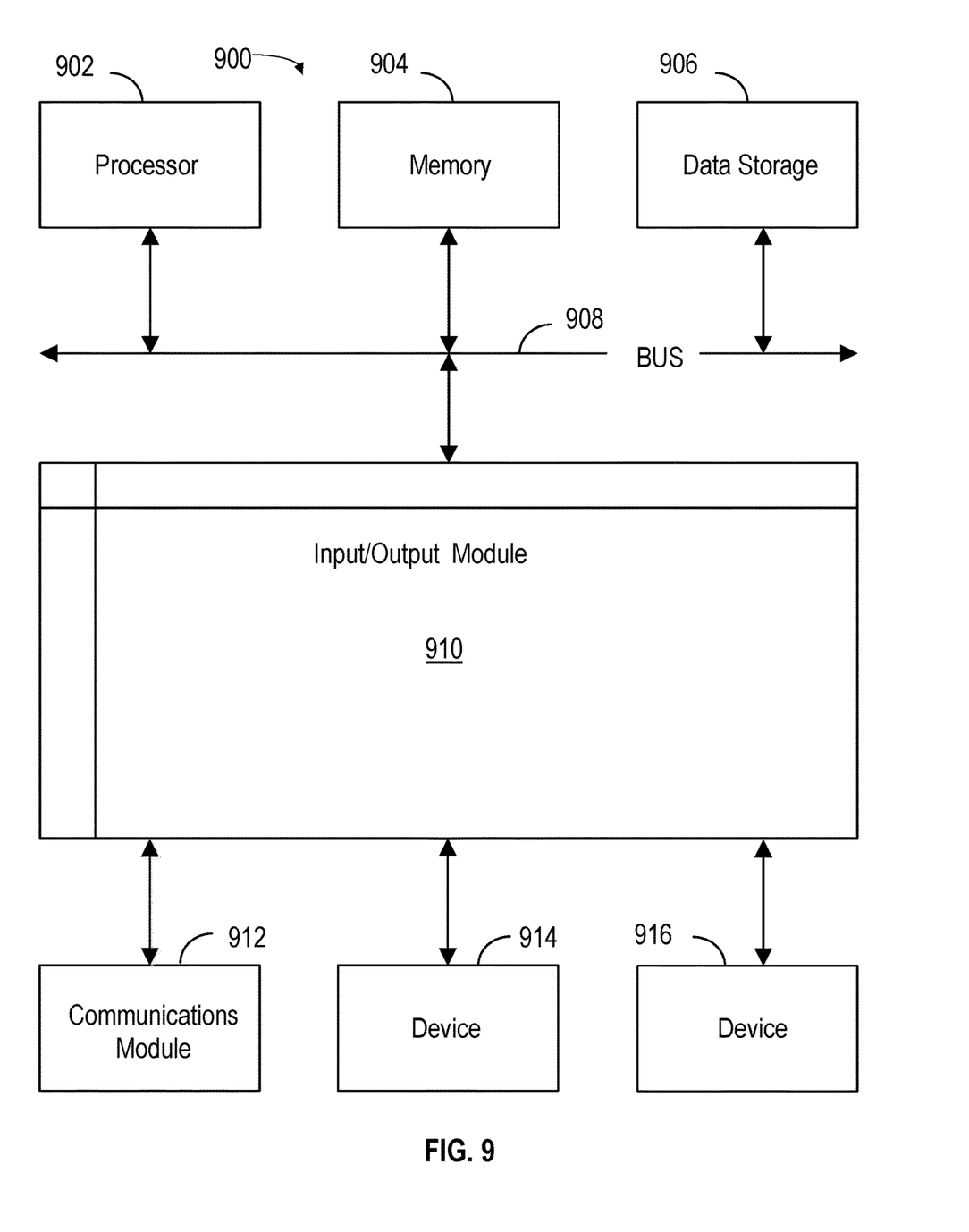
FIG. 9 is a block diagram illustrating an example computer system with which the client and network device of FIGS. 1 and 2 and the method of FIG. 8 can be implemented.

FIG. 9 is a block diagram illustrating an exemplary computer system 900 with which the client device 110 and network device 130 of FIGS. 1 and 2, and the method of FIG. 8 can be implemented. In certain aspects, the computer system 900 may be implemented using hardware or a combination of software and hardware, either in a dedicated network device, or integrated into another entity, or distributed across multiple entities.

Computer system 900 (e.g., client device 110 and network device 130) includes a bus 908 or other communication mechanism for communicating information, and a processor 902 (e.g., processors 212 and 236) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, e.g., one or more modules of computer program instructions encoded on a computer readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage hardware component 906 such as a magnetic disk or optical disk, coupled to bus 908 for storing information and instructions. Computer system 900 may be coupled via input/output module 910 to various devices. Input/output module 910 can be any input/output module. Exemplary input/output modules 910 include data ports such as USB ports. The input/output module 910 is configured to connect to a communications module 912. Exemplary communications modules 912 (e.g., communications modules 218 and 238) include networking interface cards, such as Ethernet cards and modems. In certain aspects, input/output module 910 is configured to connect to a plurality of devices, such as an input device 914 (e.g., input device 214) and/or an output device 916 (e.g., output device 216). Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 916 include display devices, such as an LCD (liquid crystal display) monitor, for displaying information to the user.

According to one aspect of the present disclosure, the client device 110 and network device 130 can be implemented using a computer system 900 in response to processor 902 executing one or more sequences of one or more instructions contained in memory 904. Such instructions may be read into memory 904 from another machine-readable medium, such as data storage hardware component 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data network device, or that includes a middleware component, e.g., an application network device, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and network devices. A client and network device are generally remote from each other and typically interact through a communication network. The relationship of client and network device arises by virtue of computer programs running on the respective computers and having a client-network device relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage hardware component 906. Volatile media include dynamic memory, such as memory 904. Transmission media include coaxial cables, copper wire, and fiber optics, including the wires forming bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. §112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method comprising:
   receiving, at a client device, a plurality of monitors each including at least one resource related to a network device;
   automatically displaying, on the client device, a subset of the plurality of monitors including the at least one resource on a first time series chart based on a pre-determined risk factor;
   at least one of (1) selecting, using the client device, at least one monitor not included in the subset and included in the plurality of monitors, and (2) un-selecting, using the client device, at least one monitor included in the subset, and thereby obtain a customized set of monitors and resources;
   accessing, using the client device, a time series database associated to the network device to query for data related to resources included in the customized set of monitors; and
   displaying, on the client device, the customized set of monitors and the included resources on a second time series chart.

2. The computer-implemented method of claim 1, further comprising determining the subset of the plurality of monitors for displaying automatically using a pre-determined algorithm, the pre-determined algorithm determining the subset of the plurality of monitors based on the pre-determined risk factor.

3. The computer-implemented method of claim 1, wherein the selected at least one monitor includes a plurality of resources, and the method further comprises:
   displaying the plurality of resources upon selection of the at least one monitor; and
   toggling one or more of the plurality of resources based on a user preference that is facilitated by the pre-determined risk factor.

4. The computer-implemented method of claim 1, wherein the selecting and un-selecting of the at least one monitor is based on a user preference that is facilitated by the pre-determined risk factor.

5. The computer-implemented method of claim 1, wherein selecting the at least one monitor not included in the subset comprises at least one of (1) selecting, of the at least one monitor, at least one resource not included in the subset, and (2) un-select, of the at least one monitor, at least one resource not included in the subset.

6. The computer-implemented method of claim 5, wherein the pre-determined risk factor is based on contextual information associated with the at least one resource and wherein selecting the at least one resource and un-selecting the at least one resource is based on the contextual information.

7. The computer-implemented method of claim 6, wherein the contextual information includes one or more of alert totals, name of resource, and aggregation function.

8. A system, comprising:
   a memory storing instructions; and
   one or more processors configured to execute the instructions to:
   receive, at a client device, a plurality of monitors each including at least one resource related to a network device;
   automatically display, on the client device, a subset of the plurality of monitors including the at least one resource on a first time series chart based on a pre-determined risk factor;

at least one of (1) select, using the client device, at least one monitor not included in the subset and included in the plurality of monitors, and (2) un-select, using the client device, at least one monitor included in the subset, and thereby obtain a customized set of monitors and resources;

access, using the client device, a time series database associated to the network device to query for data related to resources included in the customized set of monitors; and display, on the client device, the customized set of monitors and the included resources on a second time series chart.

9. The system of claim 8, wherein the one or more processors are further configured to execute instructions to determine the subset of the plurality of monitors for displaying automatically using a pre-determined algorithm, the pre-determined algorithm determining the subset of the plurality of monitors based on the pre-determined risk factor.

10. The system of claim 8, wherein the selected at least one monitor includes a plurality of resources, and the one or more processors are further configured to execute instructions to:

display the plurality of resources upon selection of the at least one monitor; and enable toggling one or more of the plurality of resources based on a user preference that is facilitated by the pre-determined risk factor.

11. The system of claim 8, wherein the one or more processors are further configured to execute instructions to enable selecting and un-selecting based on a user preference that is facilitated by the pre-determined risk factor.

12. The system of claim 8, wherein the one or more processors are further configured to execute instructions to enable selecting the at least one monitor not included in the subset by at least one of (1) selecting, of the at least one monitor, at least one resource not included in the subset, and (2) un-selecting, of the at least one monitor, at least one resource not included in the subset.

13. The system of claim 12, wherein the pre-determined risk factor is based on contextual information associated with the at least one resource and wherein the one or more processors are further configured to execute instructions to enable selecting the at least one resource and un-selecting the at least one resource by providing contextual information.

14. The system of claim 13, wherein the contextual information includes one or more of alert totals, name of resource, and aggregation function.

15. A non-transitory computer-readable storage medium comprising computer-readable program code that, when executed by a processor, causes the processor to:

receive, at a client device, a plurality of monitors each including at least one resource related to a network device;

automatically display, on the client device, a subset of the plurality of monitors including the at least one resource on a first time series chart based on a pre-determined risk factor;

at least one of (1) select, using the client device, at least one monitor not included in the subset and included in the plurality of monitors, and (2) un-select, using the client device, at least one monitor included in the subset, and thereby obtain a customized set of monitors and resources;

access, using the client device, a time series database associated to the network device to query for data related to resources included in the customized set of monitors; and display, on the client device, the customized set of monitors and the included resources on a second time series chart.

16. The non-transitory computer-readable storage medium of claim 15, wherein executing the computer-readable program code further causes the processor to determine the subset of the plurality of monitors for displaying automatically using a pre-determined algorithm, the pre-determined algorithm determining the subset of the plurality of monitors based on the pre-determined risk factor.

17. The non-transitory computer-readable storage medium of claim 15, wherein the selected at least one monitor includes a plurality of resources and wherein executing the computer-readable program code further causes the processor to:

display the plurality of resources upon selection of the at least one monitor; and enable toggling one or more of the plurality of resources based on a user preference that is facilitated by the pre-determined risk factor.

18. The non-transitory computer-readable storage medium of claim 15, wherein executing the computer-readable program code further causes the processor to enable selecting and un-selecting based on a user preference that is facilitated by the pre-determined risk factor.

19. The non-transitory computer-readable storage medium of claim 15, wherein executing the computer-readable program code further causes the processor to enable selecting the at least one monitor not included in the subset by at least one of (1) selecting, of the at least one monitor, at least one resource not included in the subset, and (2) un-selecting, of the at least one monitor, at least one resource not included in the subset.

20. The non-transitory computer-readable storage medium of claim 19, wherein the pre-determined risk factor is based on contextual information associated with the at least one resource, the contextual information includes one or more of alert totals, name of resource, and aggregation function, and wherein executing the computer-readable program code further causes the processor to enable selecting the at least one resource and un-selecting the at least one resource by providing contextual data associated with the at least one resource.

* * * * *